(12) United States Patent
Fletcher, III et al.

(10) Patent No.: US 7,722,777 B2
(45) Date of Patent: May 25, 2010

(54) METHOD OF PREPARING CORE RODS FOR OPTICAL FIBER PREFORMS

(75) Inventors: Joseph P. Fletcher, III, Marietta, GA (US); Lazhar Mazlout, Duluth, GA (US); Michael Pate, Senoia, GA (US)

(73) Assignee: OFS Fitel, LLC, Norcross, GA (US)

( * ) Notice: Subject to any disclaimer, the term of this patent is extended or adjusted under 35 U.S.C. 154(b) by 890 days.

(21) Appl. No.: 11/582,168

(22) Filed: Oct. 17, 2006

(65) Prior Publication Data

US 2008/0087303 A1    Apr. 17, 2008

(51) Int. Cl.
C03C 15/00 (2006.01)
B08B 3/00 (2006.01)

(52) U.S. Cl. .............. 216/24; 216/83; 216/93; 216/97; 134/2; 134/3; 65/412; 65/429

(58) Field of Classification Search ............... None
See application file for complete search history.

(56) References Cited

U.S. PATENT DOCUMENTS

| | | | | |
|---|---|---|---|---|
| 4,774,401 A | * | 9/1988 | Yamada et al. | 250/201.2 |
| 5,618,326 A | * | 4/1997 | Szebesta et al. | 65/388 |
| 5,834,786 A | * | 11/1998 | White et al. | 250/492.21 |
| 5,897,679 A | * | 4/1999 | Anderson et al. | 65/382 |
| 6,243,522 B1 | * | 6/2001 | Allan et al. | 385/123 |
| 6,434,975 B2 | * | 8/2002 | Berkey | 65/403 |
| 6,446,468 B1 | * | 9/2002 | Fleming et al. | 65/412 |
| 7,641,969 B2 | * | 1/2010 | Fletcher, III | 428/364 |
| 2002/0134113 A1 | * | 9/2002 | Berkey | 65/397 |
| 2003/0056550 A1 | * | 3/2003 | Tanaka et al. | 65/428 |
| 2004/0107735 A1 | | 6/2004 | Fletcher, III | |
| 2004/0139765 A1 | * | 7/2004 | Hirano et al. | 65/412 |
| 2005/0100305 A1 | * | 5/2005 | Domres et al. | 385/142 |
| 2006/0216527 A1 | * | 9/2006 | Fletcher, III | 428/432 |
| 2007/0022787 A1 | * | 2/2007 | Gupta et al. | 65/416 |
| 2008/0107385 A1 | * | 5/2008 | Ohga et al. | 385/123 |
| 2009/0181842 A1 | * | 7/2009 | Proulx et al. | 501/37 |

* cited by examiner

*Primary Examiner*—Anita K Alanko
(74) *Attorney, Agent, or Firm*—Law Office of Leo Zucker; Michael A. Morra

(57) ABSTRACT

Core rods or other glass components associated with optical fiber preforms are cleaned by loading them into a number of first sleeves, and partially obstructing entrance and exit ends of the sleeves to retain the components. The sleeves are contained inside a second sleeve so that the entrance ends of the first sleeves face an entrance end of the second sleeve. A fluid delivery system supplies cleaning fluids to the entrance end of the second sleeve, so that the fluids enter the first sleeves and contact exposed surfaces of the loaded components. The fluids leave the exit ends of the first sleeves and purge from an exit end of the second sleeve. Separators may be placed between the components in the first sleeves to enhance cleaning action and to cushion adjacent end faces of the components. Cleaned components may be unloaded from the first sleeves without risk of contamination.

21 Claims, 7 Drawing Sheets

METHOD OF PREPARING CORE RODS FOR OPTICAL FIBER PREFORMS

BACKGROUND OF THE INVENTION

1. Field of the Invention

This invention concerns the production of glass preforms for optical fibers, particularly preforms of the rod-in-tube (RIT) variety.

2. Discussion of the Known Art

Initial stages of RIT fiber preform manufacture include inserting one or more core rods axially inside of a glass overclad tube. Typically, a core rod has a handle extending from one end so that it can be transported manually without risk of contaminating the rod's core material. The rod handle may also be used for product identification and tracking purposes.

In conventional RIT processes, a single core rod is inserted in an axial passage in the overclad tube with the aid of the rod's attached handle. A sacrificial glass spacer may also be inserted to fill the entire length of the axial passage in the tube. The handle remains attached to the core rod until a final overcladding process step, at which time the handle is removed.

It is also known to use multiple core rods by welding them end to end to form a continuous length of core material. This is a costly additional step, however, and may have a negative effect on the quality of fiber drawn from the preform at locations corresponding to the welds, due to an added hydroxyl (OH) concentration induced by the weld heat source.

Process improvements such as placing multiple core rods inside a single overclad tube or the use of a mechanical assembly, require that the handle of the core rod be removed before inserting the core material of the rod inside one or more overclad tubes. For additional cost reduction and to maintain zero water peak quality in optical fibers such as, for example, AllWave® fibers available from OFS Fitel USA, the core rods must be deeply etched with HF acid to remove residual surface water from the VAD process before the rods are inserted in an overclad tube.

A technique that allows core rods without handles to be cleaned, etched, and inserted in an overclad tube without having to contact the rod material directly by hand, is disclosed in co-pending U.S. patent application Ser. No. 11/088,076 filed Mar. 23, 2005, entitled "Optical Fiber Preform with Overclad Tubes" and assigned to the assignee of the present application. In the disclosed technique, a glass spacer, a number of core rod segments, and a tube plug are loaded into an elongated tubular holder or sleeve. Plastics ball spacers are disposed between confronting end faces of the segments, between the glass spacer and an uppermost rod segment, and between the plug and a lowermost rod segment. The technique allows the glass spacer, the rod segments and the tube plug to be washed clean by flowing an acid solution between open front and rear ends of the tubular holder, followed by a rinse with deionized water. Once cleaned, an open front end of the holder is aligned with the axial passage in an overclad tube, and the core rod segments are urged successively into the tube passage by inserting a push rod through the open rear end of the holder.

A procedure that enables many core rods (or rod segments) to be cleaned simultaneously while loaded in multiple holders, would therefore significantly reduce the time and cost required to manufacture RIT preforms in volume.

SUMMARY OF THE INVENTION

According to the invention, a method of cleaning core rods or other components associated with glass optical fiber preforms includes providing a number of first sleeves each having an axis, an entrance end, and an exit end axially opposite to the entrance end. One or more core rods are loaded into each of the sleeves, and the entrance and the exit ends of the sleeves are partially obstructed to retain the loaded core rods inside the sleeves. The loaded first sleeves are disposed together inside a second sleeve so that the entrance ends of the first sleeves face toward an entrance end of the second sleeve. The entrance end of the second sleeve is coupled with a fluid delivery system, and fluids supplied from the system enter the first sleeves and contact exposed surfaces of the core rods to clean and/or etch the rods. The fluids purge from the exit ends of the first sleeves and are directed out from an exit end of the second sleeve.

For a better understanding of the invention, reference is made to the following description taken in conjunction with the accompanying drawing and the appended claims.

DETAILED DESCRIPTION OF THE INVENTION

Figure 1:
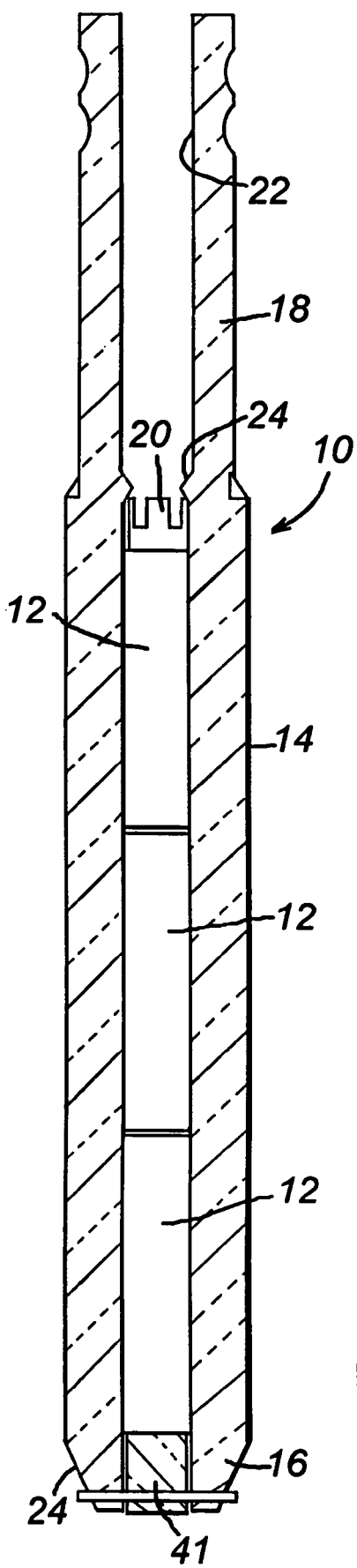
FIG. 1 is a sectional view of a RIT optical fiber preform including a number of core rods.

FIG. 1 shows a rod-in-tube (RIT) optical fiber preform 10 that may be assembled with the aid of the present invention. The preform 10 includes a number of cylindrical core rods (also called "rod segments") 12 that are stacked axially end to end inside a glass overclad tube 14. The rods 12 may originate from a single long cladded core rod produced by a known modified chemical vapor deposition (MCVD) process, or by an equivalent process such as, for example, vapor axial deposition (VAD) or outside vapor deposition (OVD). Alternatively, each of the rods 12 may comprise uncladded fiber core material only. Preferably, the axial end faces of the rods 12 are cut flat using, e.g., a diamond saw.

The overclad tube 14 may be obtained, for example, in the form of a commercially available silica glass cylinder. In the illustrated embodiment, the circumference of a distal or lower end 16 of the tube 14 as viewed in the drawing, is formed with a frustoconical shape and has a radially inward taper of, e.g., approximately 24 degrees. A hollow cylindrical handle 18 is formed at the top of the tube 14, and a short glass spacer 20 is disposed at the bottom of an axial bore 22 in the handle 18. The spacer 20 is constructed and arranged to block upward movement of the core rods 12 inside the tube 14. The spacer 20 may be inserted axially from the bottom end of the overclad tube 14 as viewed in FIG. 1, to a position where the spacer is blocked from sliding up into the handle bore 22 by way of an annular protrusion or step 24 on the inner circumference of the tube 14.

Further details of the preform 10 are disclosed, for example, in co-pending U.S. patent application Ser. No. 10/309,852 filed Dec. 4, 2002, entitled "Rod in Tube Optical Fiber Preform and Method" and assigned to the assignee of the present application. See also the earlier mentioned U.S. patent application Ser. No. 11/088,076 filed Mar. 23, 2005, which discloses a double overclad version of the preform 10. All relevant portions of the '852 and the '076 applications are incorporated by reference. It will be understood, however, that the inventive process as disclosed herein may be applied in general to RIT preforms of various sizes and shapes and which have one or more overclad tubes.

Figure 2:
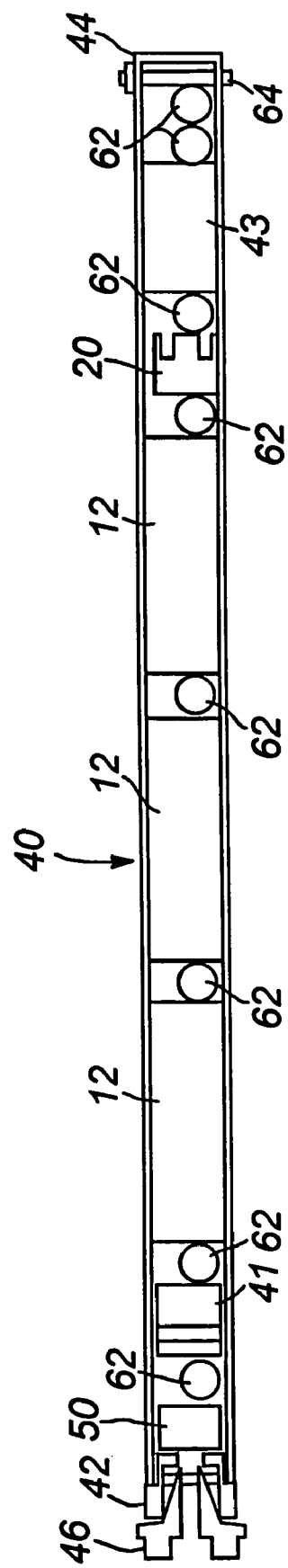
FIG. 2 shows a sleeve in which the core rods are cleaned before assembly with the preform in FIG. 1, according to the invention.

FIG. 2 shows an elongated cylindrical sleeve 40 inside which the core rods 12 and other components are arranged to be cleaned. The sleeve 40 facilitates the cleaning and etching of the core rods 12, and enables the cleaned rods to be inserted directly into the overclad tube 14 in FIG. 1 together with the spacer 20 and an overclad tube plug 41 without risk of contamination. The sleeve 40 may be formed of, e.g., polypropylene, PTFE or an equivalent material that is resistant to strong acid and base solutions. Depending on the number of the core rods 12 to be inserted in an overclad tube, the sleeve 40 may be as long as three meters or greater. A plastics alignment block 43 is also placed inside the sleeve 40, for aligning the sleeve 40 axially with the overclad tube 14 as explained below.

Any handles associated with the core rods 12 are removed before the rods are inserted into the sleeve 40 for cleaning. Because the handles are typically cut off using a diamond saw, the remaining core material is subject to a risk of contamination from, inter alia, the cutting debris. Therefore, the rods must be cleaned in order to remove any contamination and/or surface water produced by prior processing or handling of the rods, and to ensure the required product quality (i.e., few breaks, high yield, and low attenuation). The sleeve 40 is dimensioned and formed to allow one or more cleaning fluids to enter the sleeve 40 at an open entrance end 42, and to allow the fluids to purge from an open exit end 44 of the sleeve axially opposite the entrance end 42. The fluid flows act to clean and/or etch the exposed surfaces of the core rods 12, as detailed below.

Fluids may be communicated to the entrance end 42 of the sleeve 40 by way of a nozzle 46 which may be part of an external washing or fluid delivery system. As shown in detail in FIG. 8, the inside diameter of the axial passage in the sleeve 40 at the entrance end 42 is reduced, and the entrance end is formed so that the nozzle 46 can establish a fluid tight seal with the sleeve when a leading portion of the nozzle 46 is seated in the entrance end 42 to communicate fluids into the passage in the sleeve.

Figure 3:
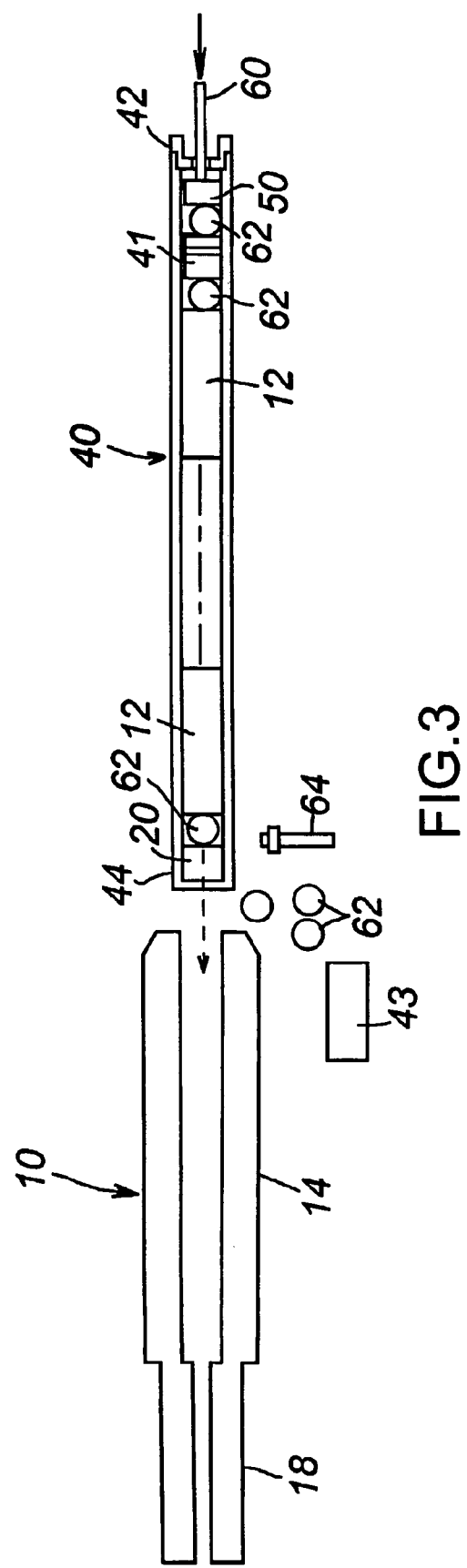
FIG. 3 shows loading of cleaned core rods from the sleeve in FIG. 2, into an overclad tube of the preform in FIG. 1.
Figure 4:
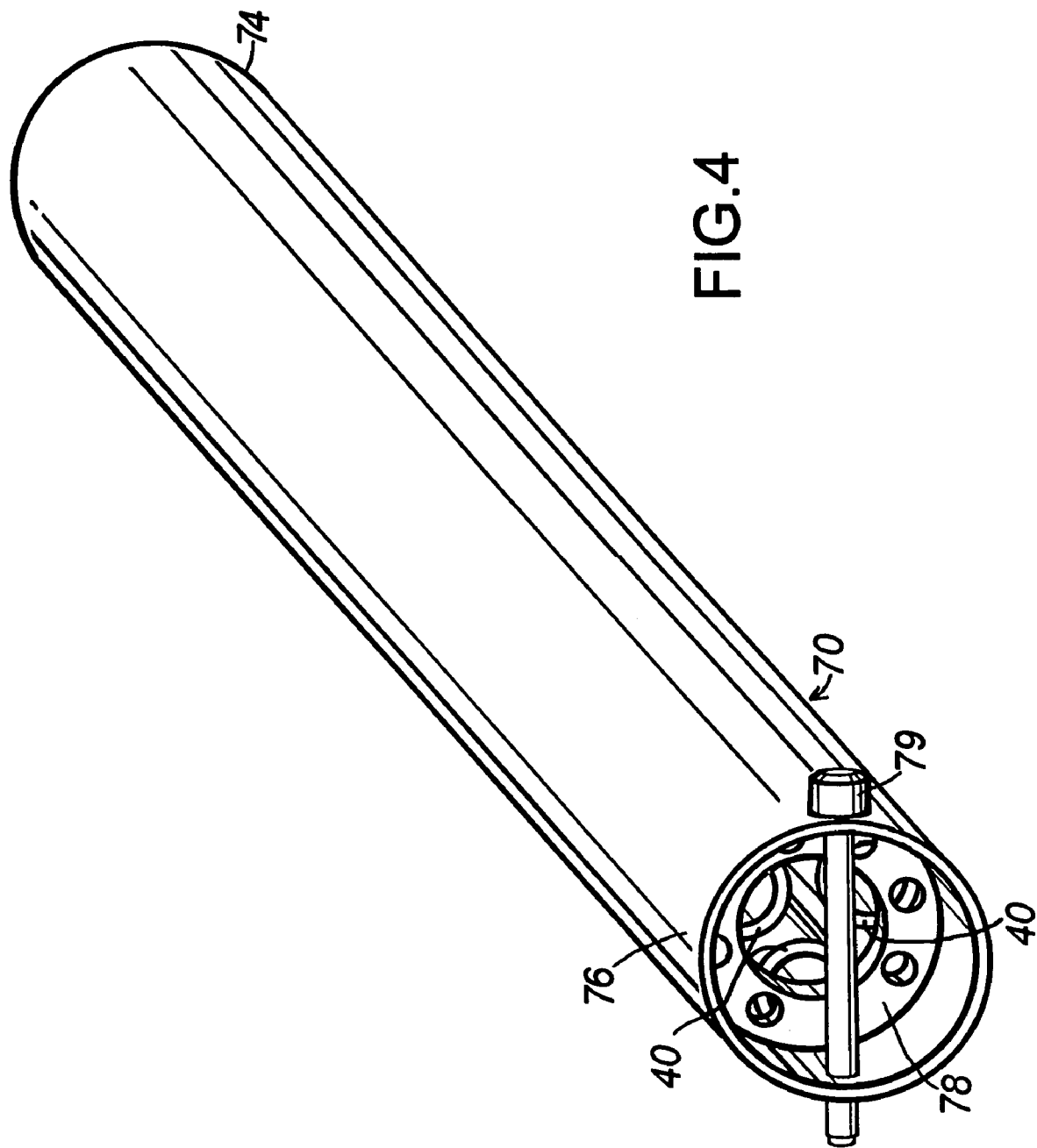
FIG. 4 is a perspective view of an outer sleeve in which a number of the sleeves of FIG. 2 are contained prior to a cleaning operation.
Figure 5:
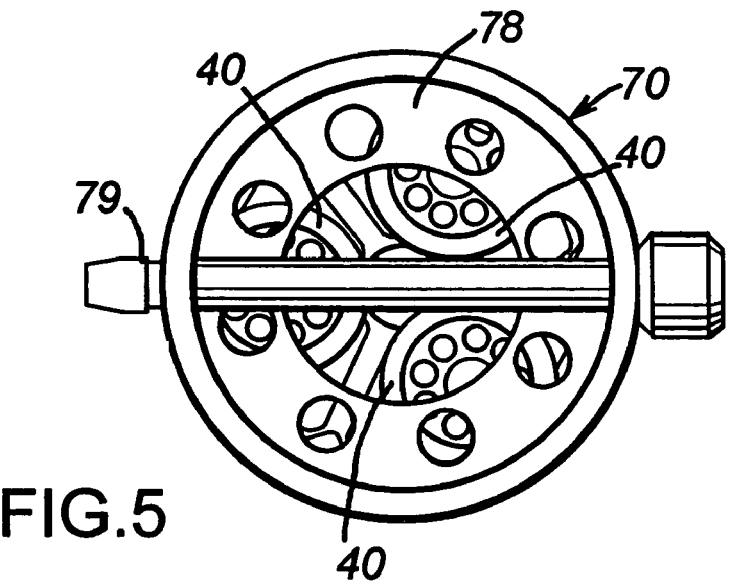
FIG. 5 shows an entrance end of the outer sleeve in FIG. 4.
Figure 6:
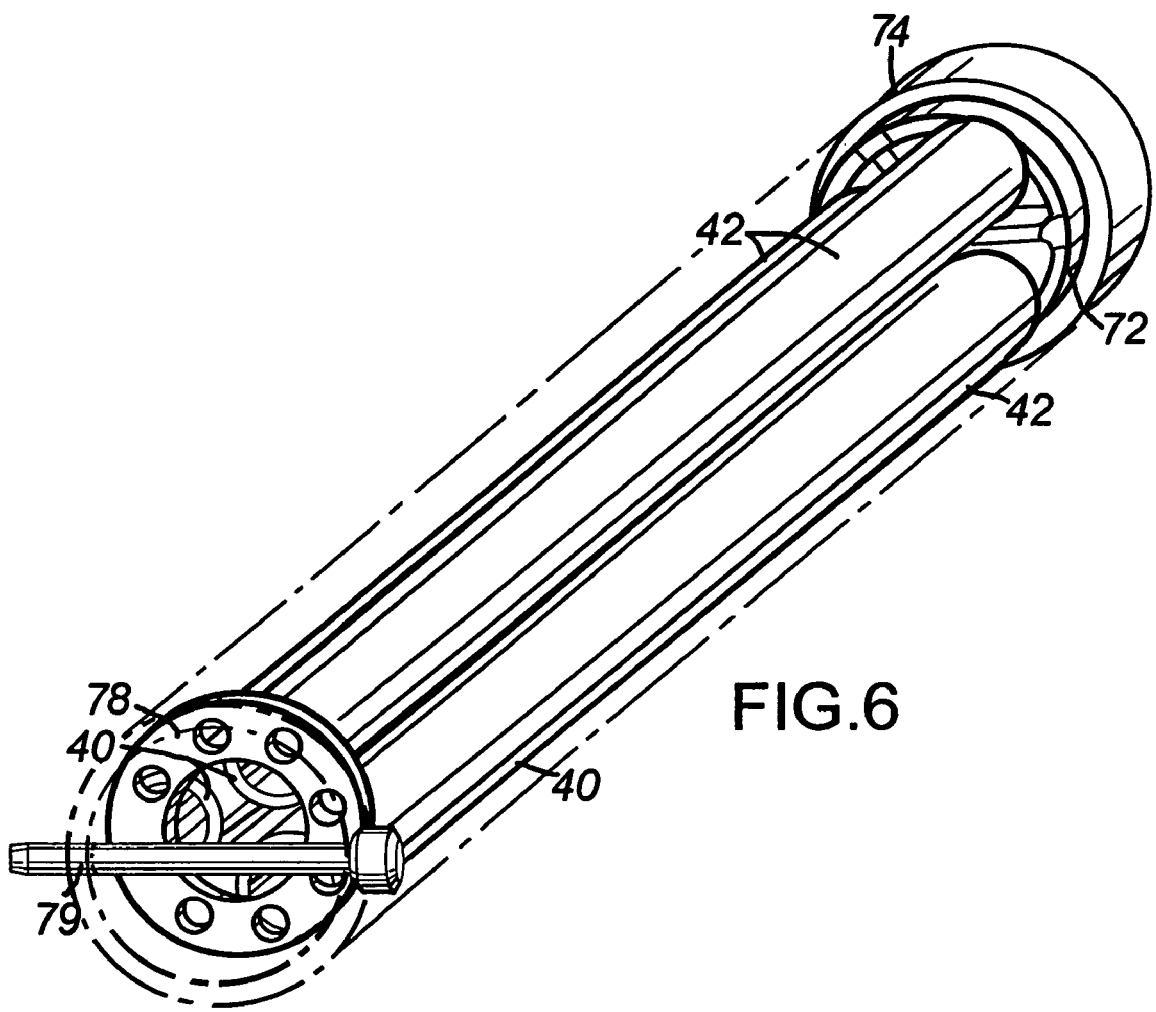
FIG. 6 shows three of the sleeves of FIG. 2 as disposed inside the outer sleeve (not shown) of FIG. 4.

The exit end 44 of the sleeve 40 is formed to allow cleaning fluids supplied at the entrance end 42 and flowing axially of the sleeve, to purge out of and away from the sleeve. The exit end 44 is also dimensioned to allow the core rods 12 to be inserted axially into the sleeve 40 through the exit end 44 prior to cleaning, and to be ejected out of the exit end 44 thereafter. While the core rods 12 may be inserted by hand through the exit end for cleaning, touching of the cleaned rods before they are inserted into the overclad tube 14 must be avoided to ensure appropriate product quality for the reasons discussed above. Accordingly, as seen in FIG. 3, a plastics push rod 60 may be inserted through the entrance end 42 of the sleeve 40, to push the core rods 12 and certain other components inside the sleeve out of the exit end 44 and directly into the axial passage of the overclad tube 14 in FIG. 1.

Figure 8:
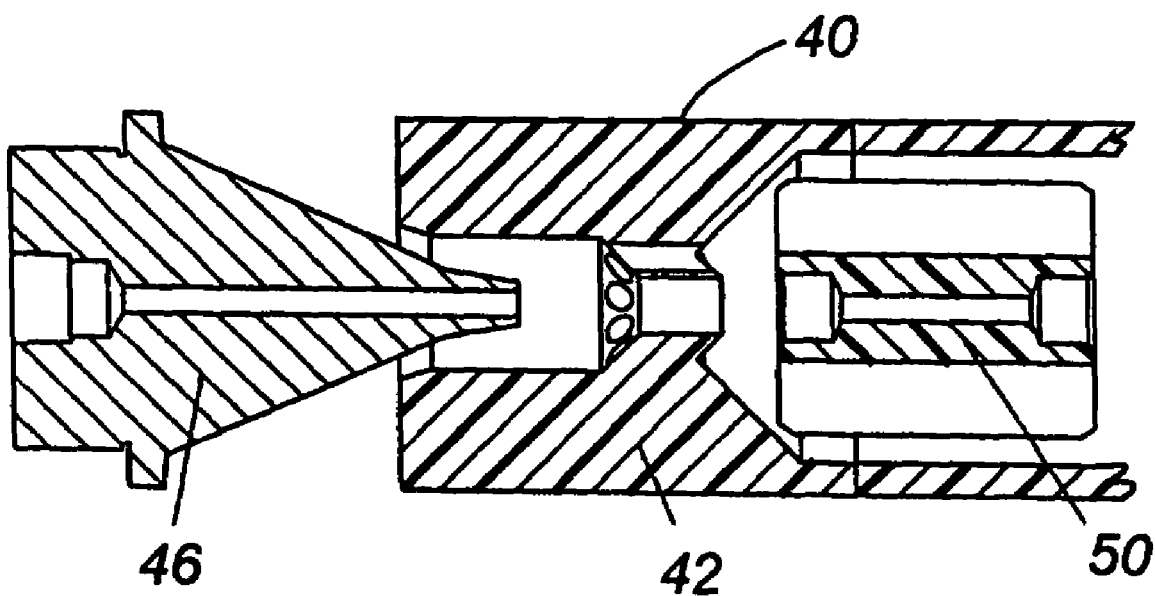
FIG. 8 is a detail view of a fluid entrance end of the sleeve in FIG. 2.

A push block 50 is first loaded through the exit end 44 of the sleeve 40 and, as seen in FIG. 2, the block 50 is disposed adjacent to the entrance end 42. See FIG. 8. The block 50 may be formed of, e.g., polypropylene and have axial passages and/or grooves of sufficient cross section as to allow the cleaning fluids to pass from the entrance end 42, through the block 50 and into contact with the core rods 12 inside the sleeve 40. As seen in FIG. 8 the reduced diameter of the sleeve passage prevents the block 50 from moving out of the entrance end 42.

A plastics ball 62 is next loaded through the exit end 44, followed by the tube plug 41, a plastics ball 62, a first core rod or rod segment 12, and another ball 62. Second, third and additional core rods 12 may then be loaded through the exit end 44, with a plastics ball 62 for separating each of the rods 12. The plastics balls 62, which are disposed between axial end faces of the core rods 12, serve to cushion and protect the end faces from scratching while minimally contacting the end faces so that the latter are substantially exposed to the cleaning fluids inside the sleeve 40.

A removable transverse pin 64 is inserted through the exit end 44 of the sleeve 40 to obstruct the exit end partially enough so that the pin 64, together with the reduced diameter passage at the entrance end 42 of the sleeve, will retain the parts loaded inside the sleeve and allow cleaning fluids to flow through the sleeve during a cleaning operation. If desired, markings can be scribed on the outer surface of the sleeve 40 for product identification and tracking purposes.

As seen in FIG. 3, after a cleaning operation and with the pin 64 withdrawn, the exit end 44 of the sleeve 40 is positioned, for example, about 5 cm away from the bottom end of the overclad tube 14. The push rod 60 is inserted axially through the entrance end 42 of the sleeve 40, to displace the push block 50 toward the left in FIG. 3 and thus urge the alignment block 43 out of the exit end 44 of the sleeve toward the overclad tube 14. The sleeve 40 is then positioned with respect to the overclad tube 14 so that the block 43 is aligned with the axial passage in the overclad tube. The sleeve 40 and the tube 14 are then separated axially just enough to allow the alignment block 43 to fall away or otherwise be removed.

The push rod 60 is again urged toward the left in FIG. 3 so that the cleaned spacer 20, core rods 12, and the plug 41 are displaced out of the exit end 44 of the sleeve and directly into the axial passage of the tube 14, without touching the cleaned parts manually. The plastics balls 62 are allowed to drop away or are otherwise disposed of as the core rods 12 are inserted into the tube passage.

FIGS. 4 to 7 illustrate a system that allows the use of a number of the sleeves 40 simultaneously to clean core rods loaded inside the sleeves while the sleeves are contained inside a larger diameter outer tube or sleeve 70, thereby increasing productivity. The illustrated system accommodates three of the sleeves 40 each of which may be loaded with the core rods 12 to be cleaned. The entrance ends 42 of the sleeves 40 face toward an entrance end 74 of the outer sleeve 70. The inner diameter of the axial passage in the sleeve 70 is tapered to decrease inside the entrance end 74, and the end 74 is formed to establish a fluid tight seal with a fluid supply nozzle 75. It will be understood that two, three or more of the sleeves 40 may be disposed together within the outer sleeve

70 depending on, e.g., the diameters of the individual sleeves 40 and the inside diameter of the outer sleeve 70.

A generally cylindrical end block 72 is provided inside the entrance end 74 of the outer sleeve 70, and the reduced diameter passage obstructs the end block 72 from moving further downward. The end block 72 has such axial passages and/or grooves as to ensure that cleaning fluids supplied to the entrance end 74 of the sleeve through the nozzle 75 will pass through the block 72 and be distributed uniformly to the entrance ends 42 of each of the sleeves 40, and will flow in contact with the core rods inside the sleeves 40. The system of FIGS. 4-7 may therefore omit the use of the nozzle 46 in FIGS. 2 and 8 for each of the sleeves 40.

The exit end 76 of the outer sleeve 70 preferably contains an annular anti-float ring 78 dimensioned and arranged to rest atop each of the sleeves 40, and a removable transverse pin 79 inserted through the exit end 76 of the sleeve 70 just above the ring 78. The ring 78 and the pin 79 together act to restrain the individual loaded sleeves 40 from moving or floating upward during a cleaning operation as explained below.

Figure 7:
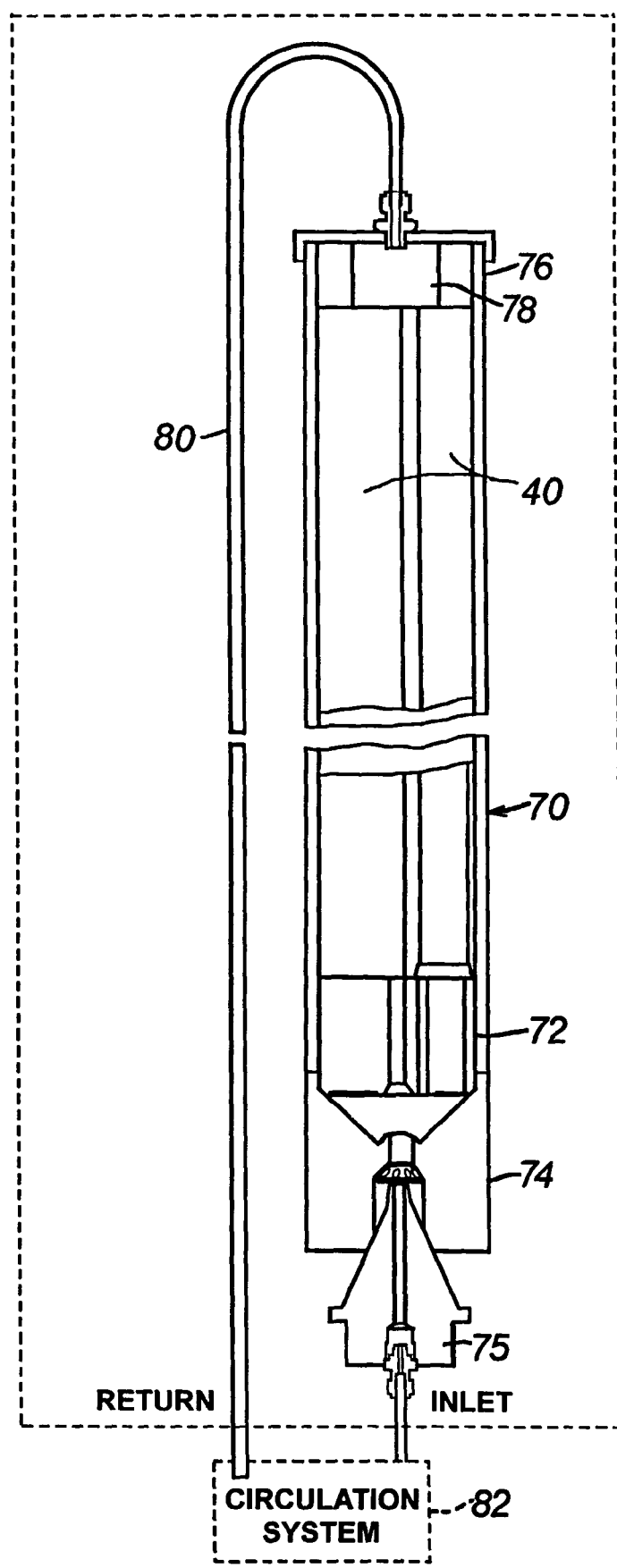
FIG. 7 is a block diagram of a dosed system for circulating cleaning fluids through the sleeves contained in the outer sleeve of FIG. 4.

Although not required in order to practice the inventive process, the exit end 76 of the outer sleeve 70 may be enclosed or capped as shown in FIG. 7 to form a closed fluid delivery system and provide for increased safety and efficiency. In FIG. 7, one end of a conduit 80 communicates with the exit end 76 of the sleeve 70, and is arranged to return cleaning fluids purging from the exit end 76 to a fluid circulation system 82 at the opposite end of the conduit 80. The FIG. 7 arrangement prevents acids and other potentially harmful liquids from escaping when the liquids are flowing inside the sleeves 40, 70. The arrangement significantly reduces the amount of cleaning liquids that would otherwise be needed if the liquids are allowed to purge freely from the exit end 76 of the sleeve 70 for collection in an outside return basin.

The core rods 12 (or other glass preform parts) contained in the sleeves 40 may be washed and cleaned by allowing various fluids supplied to the entrance end 74 of the outer sleeve 70, to enter the entrance ends 42 of the sleeves 40 and flow over exposed surfaces of the contained rods. A washing and cleaning operation may proceed, for example, as follows:

1. Rinsing the rods 12 by flowing high purity deionized water for several minutes.
2. Dissolving surface dirt and grease on the rods by flowing a liquid surfactant or cleaning detergent.
3. Rinsing the rods again with a flow of deionized water.
4. Etching the rods by flowing a 25 to 49% HF acid solution for a few minutes to a few hours, depending on the condition (e.g., OH content) of the rod surfaces.
5. Rinsing the rods a third time with a flow of deionized water.
6. Flowing an inert drying gas such as $N_2$ or clean air to dry the rods.

The circulation system 82 should be capable of maintaining a supply pressure sufficient to overcome the heights of the sleeves 40, 70 when the sleeves are vertically oriented as in FIG. 7. That is, the supply pressure should exceed the hydrostatic pressure developed at the entrance ends of the sleeves when the sleeves are supported vertically and are liquid filled, so that liquid circulation can be maintained by the system 82 over an entire cleaning operation.

As noted, the sleeves 40, 70 may also be used for cleaning other glass preform components such as overclad tubes or finished performs using the same steps described above for washing and cleaning the glass rods 12. Once cleaned, the components may be urged (e.g., by a long clean rod) out of the sleeves 40, 70 directly into a clean storage bag or other container that is free of contamination.

As disclosed herein, the inventive method enables core rods or other components associated with optical fiber preforms to be safely transported, identified, cleaned, etched, stored, and then assembled to produce an optical fiber preform. Any risk of contamination from prior handling is substantially reduced or eliminated. The method is compatible with most if not all current RIT preform manufacturing processes, and is suited for core rods produced by known MCVD, VAD, JVD or OVD techniques.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method of cleaning core rods for rod in tube (RIT) optical fiber preforms, comprising:

providing two or more first sleeves each having an axis, an entrance end, and an exit end axially opposite to the entrance end;

loading one or more core rods into each of the first sleeves;

partially obstructing the entrance and the exit ends of each of the first sleeves for retaining the loaded core rods inside the first sleeves;

providing a second sleeve having an axis, an entrance end, and an exit end axially opposite to the entrance end of the second sleeve;

placing the loaded first sleeves together inside the second sleeve so that the entrance ends of the first sleeves face toward the entrance end of the second sleeve;

coupling the entrance end of the second sleeve with a fluid delivery system;

supplying one or more fluids from the delivery system to the entrance end of the second sleeve so that the fluids flow into the entrance ends of the first sleeves and make contact with exposed surfaces of the core rods to clean or to etch the rods; and purging the fluids from the exit ends of the first sleeves, and directing the purged fluids out of the exit end of the second sleeve.

2. The method of claim 1, including placing separating members between axial end faces of core rods loaded successively in each of the first sleeves.

3. The method of claim 1, wherein the fluid supplying step includes flowing a liquid surfactant or detergent for cleaning the core rods.

4. The method of claim 1, wherein the fluid supplying step includes flowing a HF acid solution of etching the core rods.

5. The method of claim 1, wherein the fluid supplying step includes flowing water for rinsing the rods.

6. The method of claim 1, wherein the fluid supplying step includes flowing a drying gas for drying the rods.

7. The method of claim 1, including capping the exit end of the second sleeve and communicating fluids purged from the exit end of the second sleeve to a fluid circulation system.

8. The method of claim 1, including supporting the first and the second sleeves vertically during the fluid supplying step.

9. A method of assembling core rods in a rod in tube (RIT) optical fiber preform, comprising:

cleaning the core rods, by;

providing two or more first sleeves each having an axis, an entrance end, and an exit end axially opposite to the entrance end, loading one or more core rods into each of the first sleeves, partially obstructing the entrance and the exit ends of each of the first sleeves for retaining the loaded core rods inside the first sleeves, providing a second sleeve having an axis, an entrance end, and an exit end axially opposite to the entrance end of the second sleeve, placing the loaded first sleeves together inside the second sleeve so that the entrance ends of the first sleeves face toward the entrance end of the second sleeve, coupling the entrance end of the second sleeve with a fluid delivery system, supplying one or more fluids from the delivery system to the entrance end of the second sleeve so that the fluids flow into the entrance ends of the first sleeves and make contact with exposed surfaces of the core rods to clean or to etch the rods, and purging the fluids from the exit ends of the first sleeves, and directing the purged fluids out of the exit end of the second sleeve; and inserting the cleaned core rods into an overclad tube of an optical fiber preform, by;

axially aligning an end of a given one of the loaded first sleeves with the overclad tube after the cleaning step; and inserting a push rod through an opposite end of the first sleeve for urging the cleaned core rods out of the end of the first sleeve and into the overclad tube.

10. The method of claim 9, including placing separating members between axial end faces of core rods loaded successively in each of the first sleeves, and disposing of the separating members when the cleaned rods are urged out of the first sleeve and into the overclad tube.

11. The method of claim 9, wherein the fluid supplying step includes flowing a liquid surfactant or detergent for cleaning the core rods.

12. The method of claim 9, wherein the fluid supplying step includes flowing a HF acid solution for etching the core rods.

13. The method of claim 9, wherein the fluid supplying step includes flowing water for rinsing the rods.

14. The method of claim 9, wherein the fluid supplying step includes flowing a drying gas for drying the rods.

15. The method of claim 9, including capping the exit end of the second sleeve and communicating fluid purged from the exit end of the second sleeve to a fluid circulation system.

16. The method of claim 9, including supporting the first and the second sleeves vertically during the fluid supplying step.

17. A method of cleaning glass components associated with optical fiber preforms, comprising:
providing two or more first sleeves each having an axis, an entrance end, and an exit end axially opposite to the entrance end;
loading one or more glass preform components into each of the first sleeves;
partially obstructing the entrance and the exit ends of each of the first sleeves for retaining the loaded components inside the first sleeves;
providing a second sleeve having an axis, an entrance end, and an exit end axially opposite to the entrance end of the second sleeve;
placing the loaded first sleeves together inside the second sleeve so that the entrance ends of the first sleeves face toward the entrance end of the second sleeve;
coupling the entrance end of the second sleeve with a fluid delivery system;
supplying one or more fluids from the delivery system to the entrance end of the second sleeve so that the fluids flow into the entrance ends of the first sleeves and make contact with exposed surfaces of the components inside the first sleeves to clean or to etch the components; and
purging the fluids from the exit ends of the first sleeves, and directing the purged fluids out of the exit end of the second sleeve.

18. The method of claim 17, wherein the fluid supplying step includes flowing a liquid surfactant or detergent for cleaning the components.

19. The method of claim 17, wherein the fluid supplying step includes flowing a HF acid solution for etching the components.

20. The method of claim 17, wherein the fluid supplying step includes flowing water for rinsing the components.

21. The method of claim 17, wherein the fluid supplying step includes flowing a drying gas for drying the components.

* * * * *